US009138710B2

(12) United States Patent
Johns et al.

(10) Patent No.: US 9,138,710 B2
(45) Date of Patent: Sep. 22, 2015

(54) DEVICE FOR UNLOADING CATALYST FROM A REACTOR VESSEL

(75) Inventors: Clifford L. Johns, Louisville (KY); Dennis McAndrews, Jeffersonville (IN); Munaf Chasmawala, Louisville (KY); Douglas K. Cornett, Louisville (KY); Matthew Laughlin, Louisville (KY)

(73) Assignee: Extundo Incorporated, Louisville, KY (US)

(*) Notice: Subject to any disclaimer, the term of this patent is extended or adjusted under 35 U.S.C. 154(b) by 502 days.

(21) Appl. No.: 13/411,753

(22) Filed: Mar. 5, 2012

(65) Prior Publication Data

US 2012/0237412 A1    Sep. 20, 2012

Related U.S. Application Data

(60) Provisional application No. 61/454,290, filed on Mar. 18, 2011.

(51) Int. Cl.
*B01J 8/06* (2006.01)
*B65G 65/40* (2006.01)

(52) U.S. Cl.
CPC ........ *B01J 8/067* (2013.01); *B01J 2208/00761* (2013.01); *B01J 2208/00778* (2013.01); *B65G 65/40* (2013.01)

(58) Field of Classification Search
None
See application file for complete search history.

(56) References Cited

U.S. PATENT DOCUMENTS

| 3,164,272 | A | | 1/1965 | Oliver | |
|---|---|---|---|---|---|
| 3,882,565 | A | * | 5/1975 | Irwin et al. | 15/104.33 |
| 4,280,983 | A | * | 7/1981 | Irwin | 422/219 |
| 4,326,317 | A | | 4/1982 | Smith et al. | |
| 4,994,241 | A | | 2/1991 | Sapoff | |
| 5,199,129 | A | * | 4/1993 | Salecker et al. | 15/104.33 |
| 5,284,306 | A | * | 2/1994 | O | 242/405 |
| 5,837,062 | A | | 11/1998 | Easterly | |
| 6,409,154 | B1 | | 6/2002 | Quinn | |
| 2009/0292502 | A1 | | 11/2009 | Gress et al. | |
| 2010/0031460 | A1 | | 2/2010 | Eisermann et al. | |
| 2010/0132143 | A1 | | 6/2010 | Flamand | |

* cited by examiner

*Primary Examiner* — Nicole Blan
(74) *Attorney, Agent, or Firm* — Camoriano and Associates

(57) ABSTRACT

A device and method for automatic unloading of particles from the vertical tubes of a chemical reactor automatically feeds a fish tape into the bottom of the vertical tube to contact and dislodge the particles and automatically retracts the fish tape to allow the particles to fall out of the tube.

6 Claims, 16 Drawing Sheets

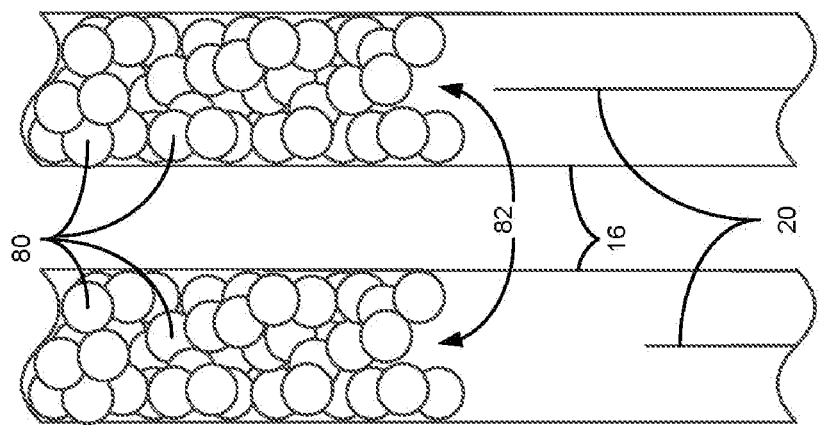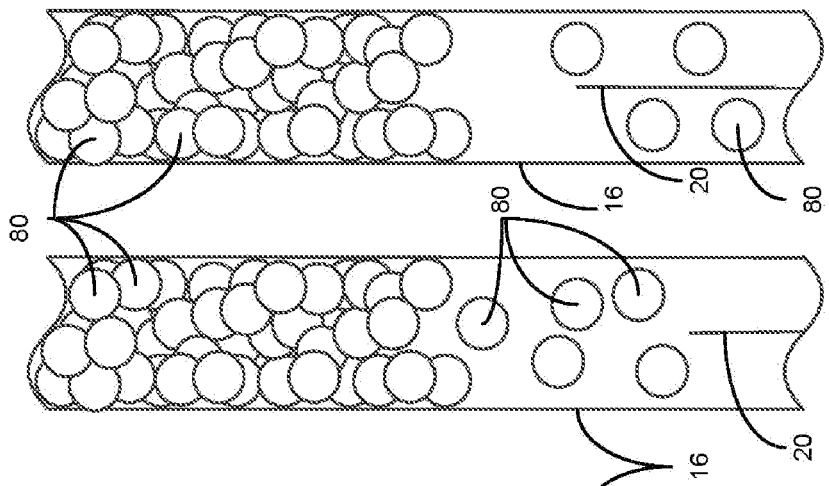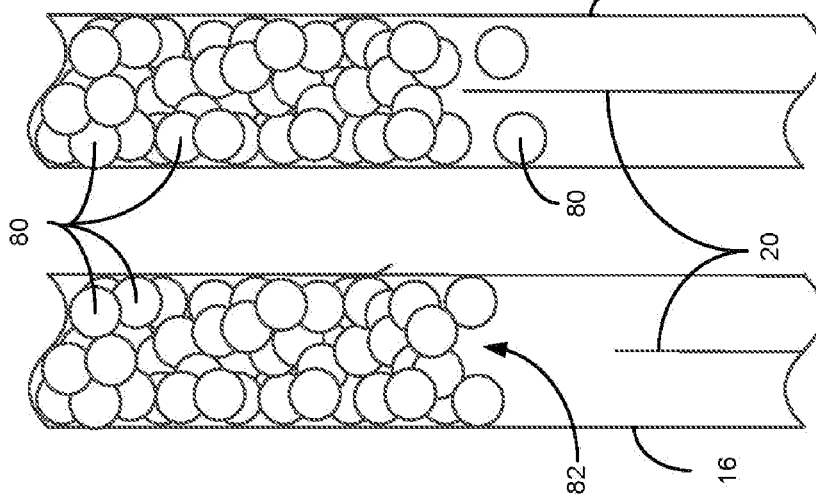

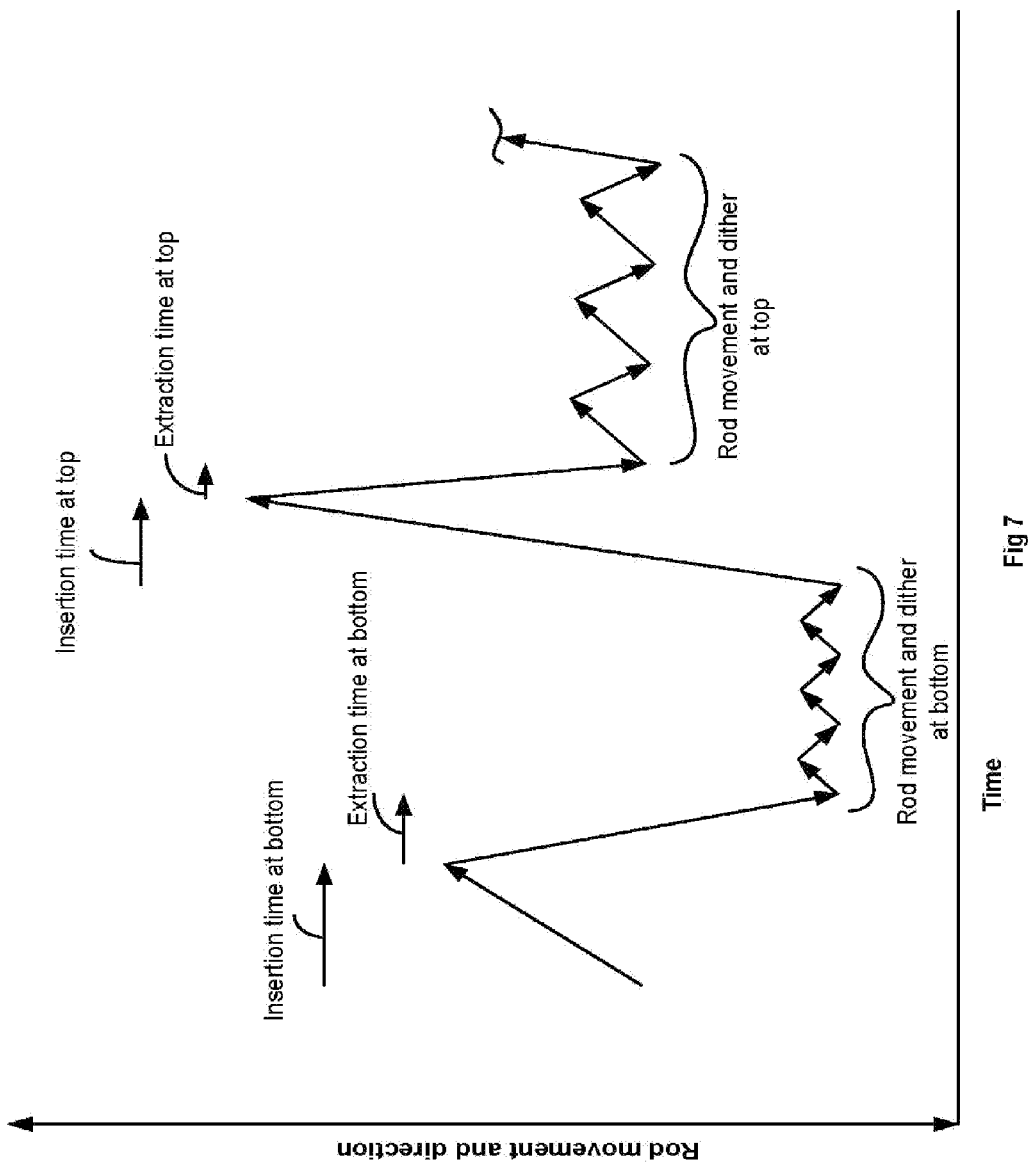

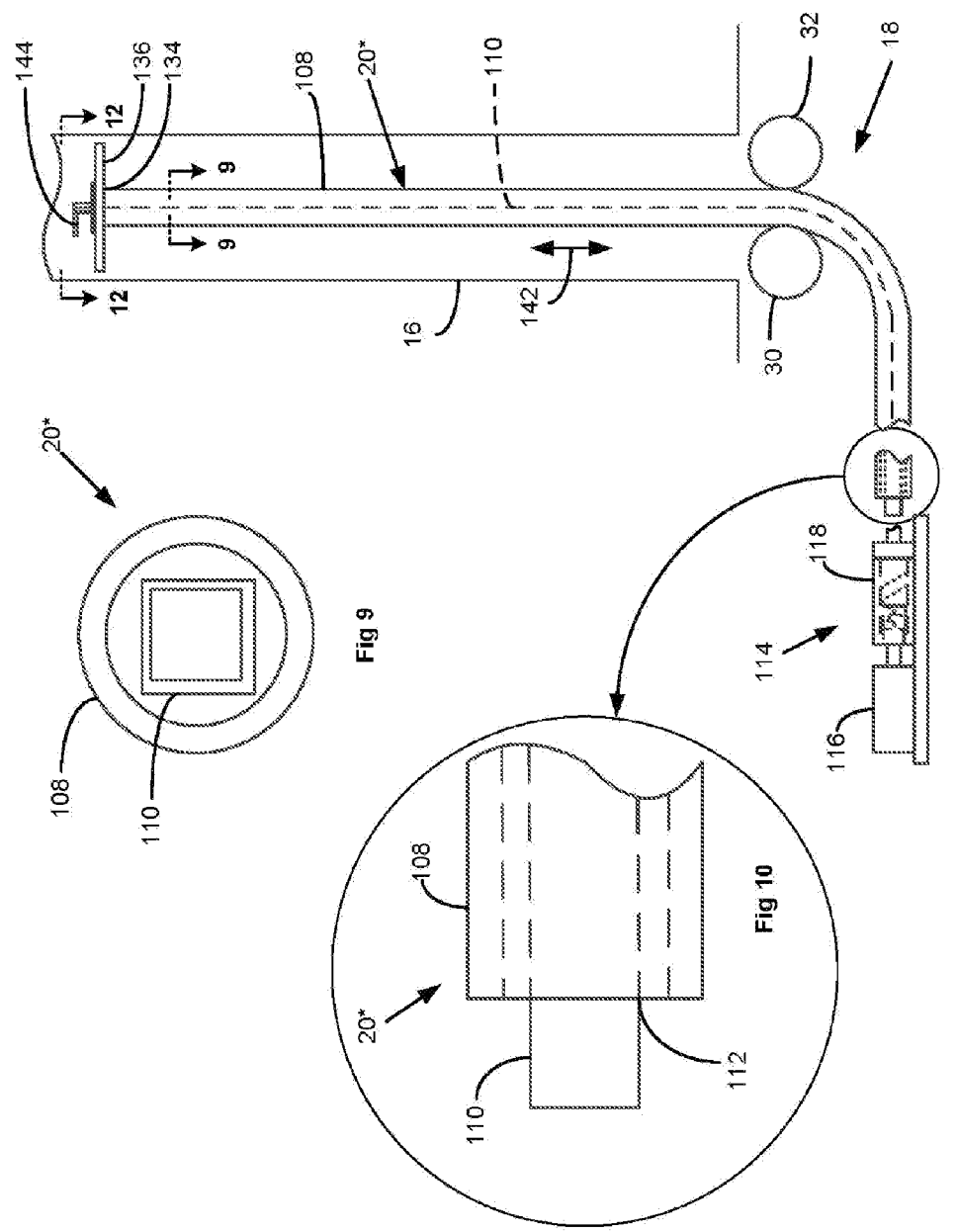

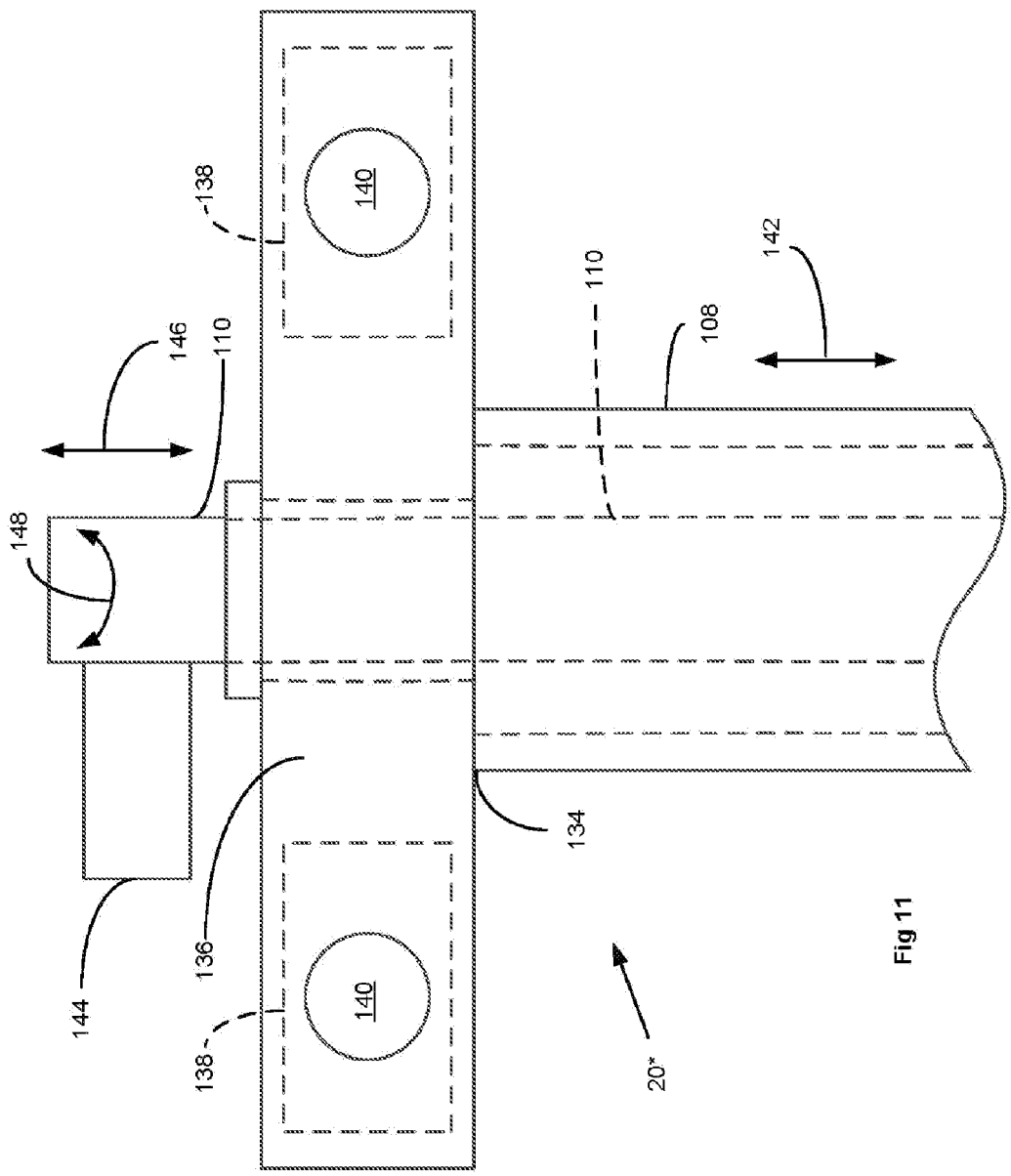

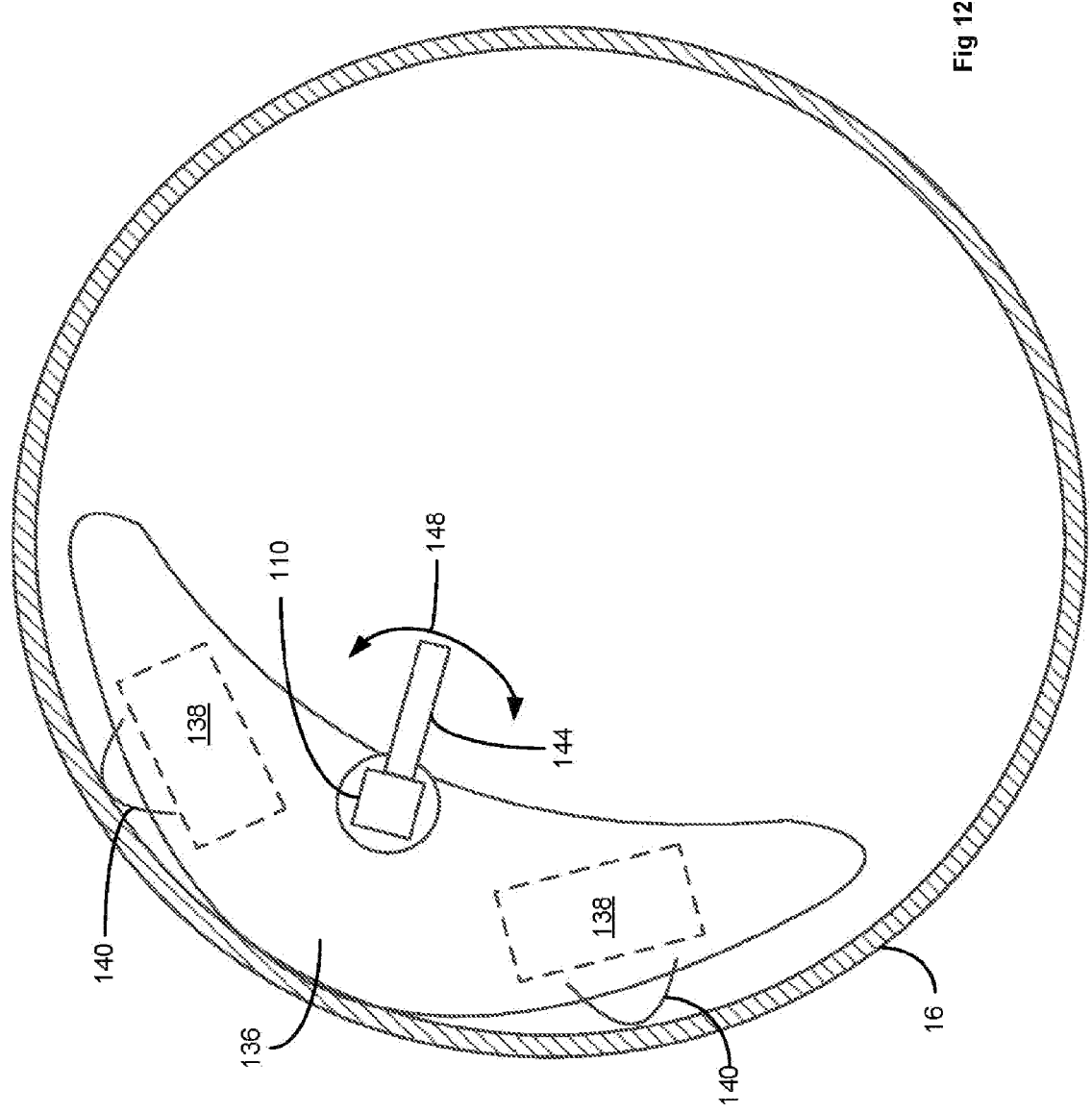

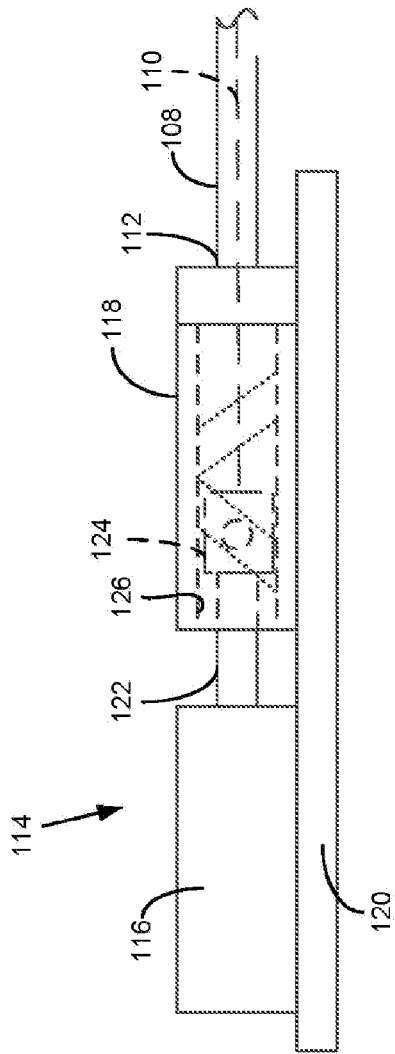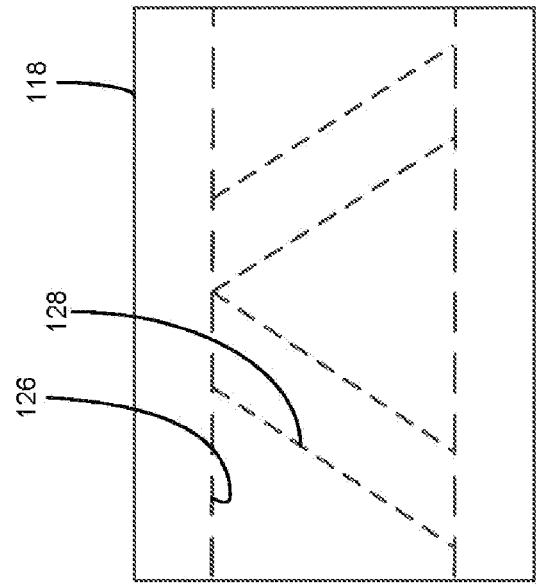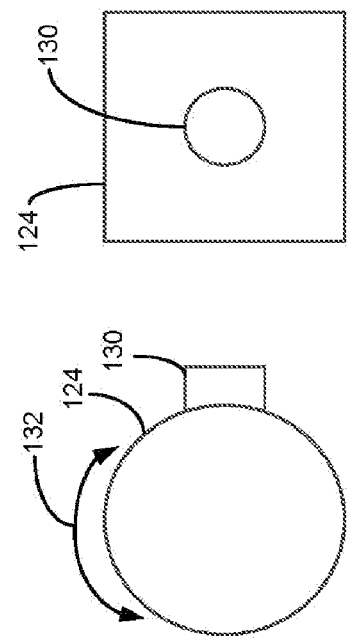

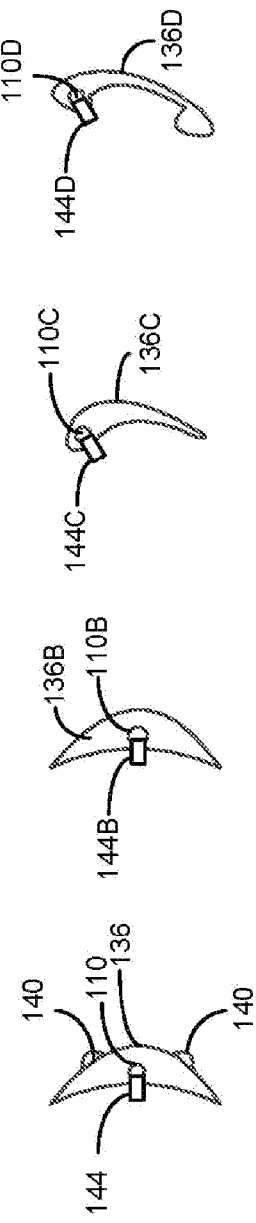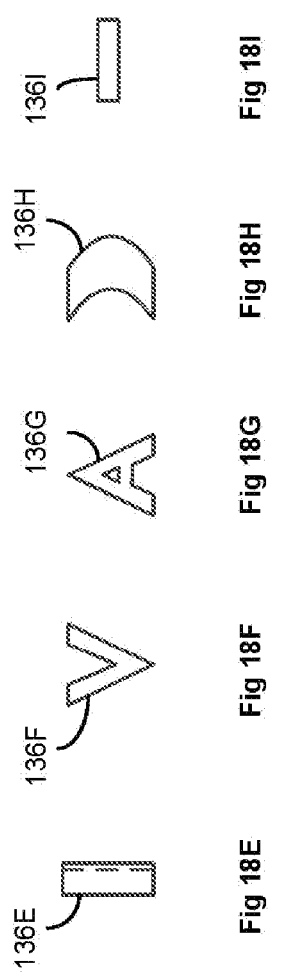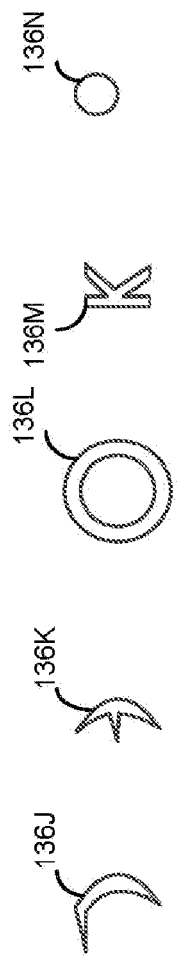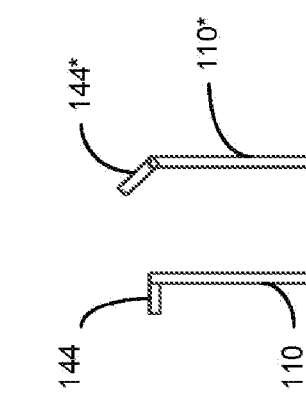

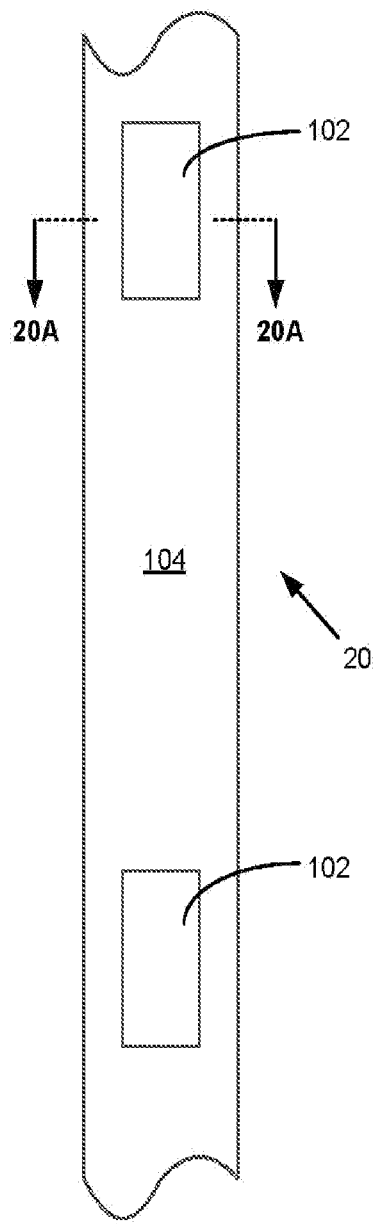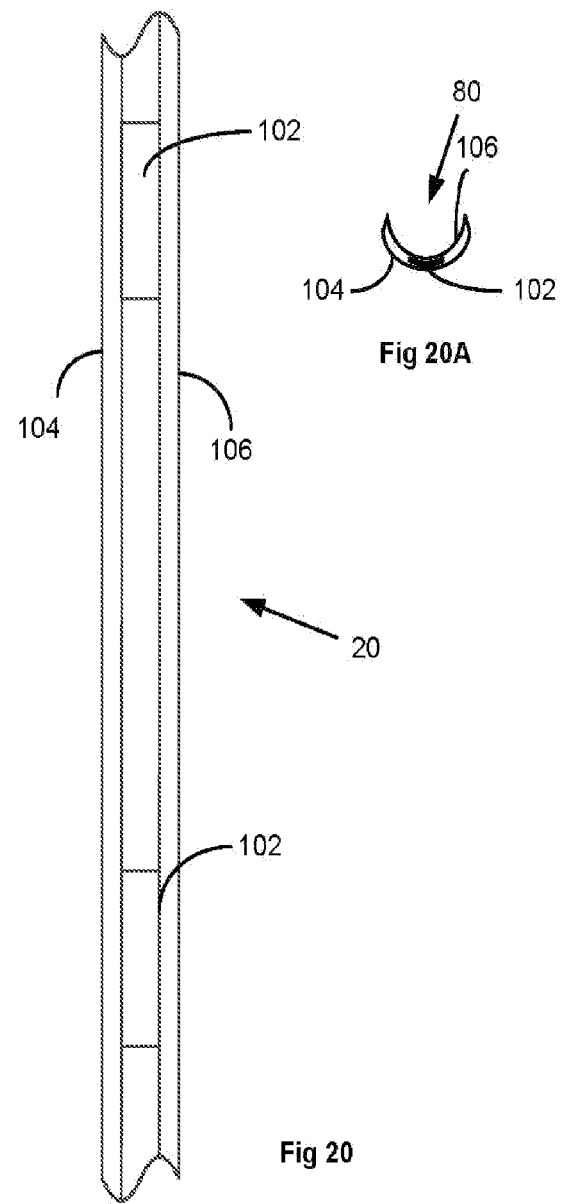
Fig 19    Fig 20    Fig 20A

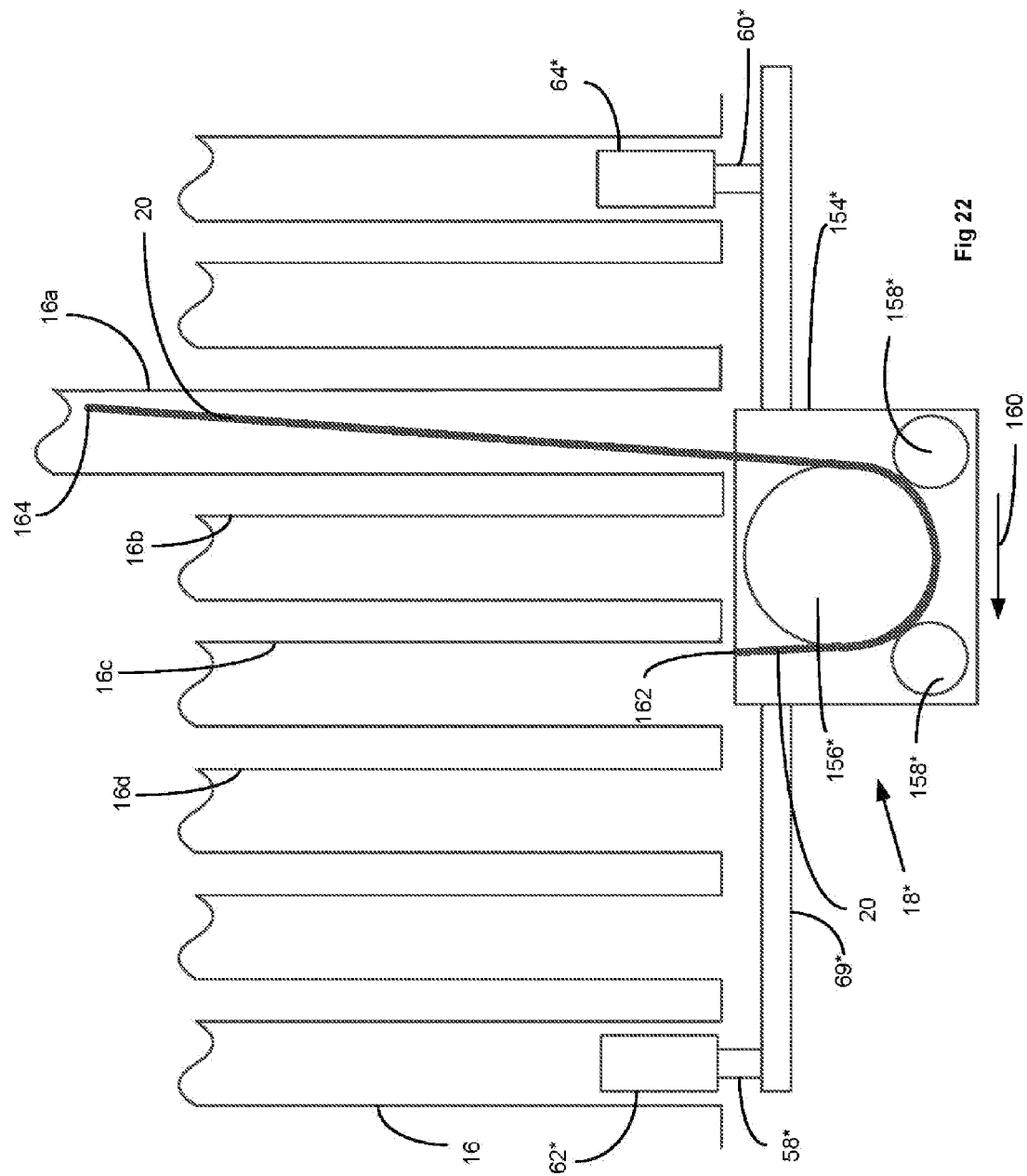

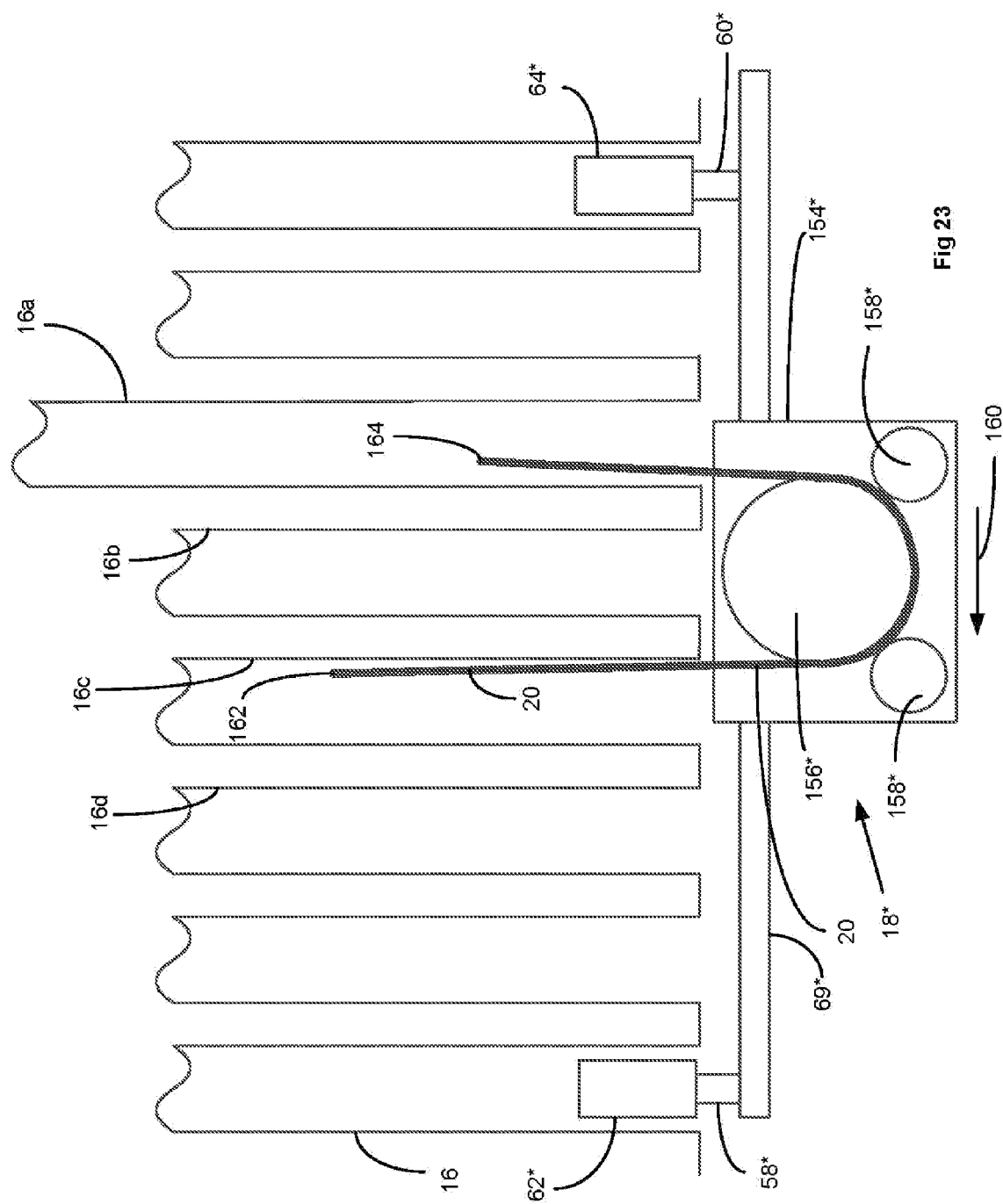

DEVICE FOR UNLOADING CATALYST FROM A REACTOR VESSEL

This application claims priority from U.S. Provisional Application Ser. No. 61/454,290 filed Mar. 18, 2011.

BACKGROUND

The present invention relates to a device for unloading catalyst or other particles from the tubes of a chemical reactor. Many chemical reactors are essentially a large shell and tube heat exchanger vessel, with the reaction occurring inside the tubes and a coolant circulating in the vessel outside the tubes. A chemical reactor vessel also can be a simple tank with a single volume of catalyst inside it, or it may be a single large tube. Some chemical reactions occur in furnace or reformer tubes, which may be a part of a system with 10 to 500 or more such tubes. In any of these reactor vessels, catalyst, typically in the form of pellets, may be loaded into the reactor to facilitate the reaction. The catalyst is replaced periodically.

The reactor tubes may be quite long, housed in a structure several stories tall. In order to replace the catalyst, the old, spent catalyst must first be removed from the reactor tubes. In the prior art, springs are first removed from the bottom of each tube in the reactor and then a fish tape is manually pushed up from the bottom of each tube to jostle the catalyst particles and evacuate each tube.

A fish tape may be a thin piece of flat steel wire or a thin rod or stiff wire that may be coiled in predetermined lengths. It usually is used to help feed wires through a pipe or conduit. When it is used for that purpose, the fish tape is first fished through a pipe or conduit and then, once it reaches the other end, wires are attached to that end, and then the fish tape is pulled back out, which feeds the wires through the pipe or conduit. However, in this instance, the fish tape is used to poke upwardly into the reactor tubes to contact the catalyst particles and jostle them to make them fall out of the tube.

As some of the catalyst particles fall out of the tube, other catalyst particles start to move downwardly but can bridge inside the tube, which prevents them from falling out of the tube. The fish tape is manually pushed in and out repeatedly to break up any bridging and allow the particles to fall out. Sometimes the fish tape is withdrawn entirely from the tube to allow catalyst particles to fall out from the tube. Care must be taken when using a fish tape to ensure that as the particles are dislodged and are in the process of falling out of the tube that they do not jam along with the fish tape and the narrow tube wall. When a fish tape is operated manually by an operator, the operator can only advance the fish tape slowly and tries to keep the fish tape constantly moving so as to not get it stuck or otherwise jammed in the tube with catalyst engulfing a portion of the fish tape such that it can neither be pushed into nor withdrawn from the tube.

SUMMARY

The present invention relates to a device for unloading catalyst from reactor tubes. In one embodiment, a fish tape is automatically fed up from the bottom of a reactor tube to jostle the catalyst particles in the tube. The motion of the fish tape may be programmed such that the fish tape is first fed upwardly to knock down some of the catalyst particles, and is then pulled downwardly to allow catalyst particles which have been knocked loose to fall out of the tube. An encoder, current transformer, or accelerometer may be used to sense lack of progress for upward motion, indicating that the fish tape has hit an obstruction and needs to be retracted. The retraction may be a partial retraction, to allow catalyst particles to fall out before the fish tape resumes poking at the catalyst particles, or it may be a full retraction out of the tube to allow the catalyst particles to fall out before a fresh start by the fish tape. The encoder also may be used to determine when a sufficient length of the fish tape has been fed into the bottom of the tube to ensure that all the catalyst particles have fallen out of the tube.

BRIEF DESCRIPTION OF THE DRAWINGS

FIGS. 6A-6F are broken away views showing the fish tape portion of an automatic catalyst unloading device being inserted upwardly until a catalyst bridge is reached in a tube, probing with the fish tape device to break the bridge, and then pulsing the fish tape device to prevent falling catalyst particles from jamming the fish tape device before once again moving the fish tape device upwardly toward the next catalyst bridge;

FIG. 7 is a graph showing the direction of motion of the fish tape as a function of time and how this relationship changes depending on the location of the end of the fish tape relative to the tube;

FIG. 8 is a partially broken away schematic, partially in section, of another embodiment of a catalyst unloading device similar to that of FIG. 2, but focusing on an alternative fish tape;

FIG. 9 is a view along line 9-9 of FIG. 8;

FIG. 10 is an enlarged, side view of the end of the fish tape that connects to a corkscrew drive of FIG. 8;

FIG. 11 is an enlarged side view of the other end of the fish tape of FIG. 8;

FIG. 12 is a view along line 12-12 of FIG. 8;

FIG. 13 is a side view of a corkscrew drive for the first end of the fish tape of FIG. 8;

FIG. 14 is an enlarged side view of the corkscrew guide of the drive of FIG. 13;

FIG. 15 is side view of the corkscrew follower plug of the drive of FIG. 13;

FIG. 15A is an end view of the follower plug of FIG. 15;

FIG. 16 is broken away, side view of the topmost end of the shaft portion of the fish tape of FIG. 8;

FIG. 17 is broken away, side view of another embodiment of the topmost end of the shaft portion of the fish tape of FIG. 8;

FIGS. 18A-18N are plan views, similar to FIG. 12, of the topmost end of the fish tape of FIG. 8, showing a variety of different embodiments;

FIG. 19 is a broken away side view of an embodiment of the fish tape of FIG. 8;

FIG. 20 is a front view of the fish tape of FIG. 19;

FIG. 20A is a view along line 20A-20A of FIG. 19;

FIG. 22 is a schematic view of a fish tape feed-and-store mechanism which may be used with the catalyst unloading device of FIG. 2;

FIG. 23 is a schematic view, similar to FIG. 22, but showing the fish tape cleaning out another tube.

DESCRIPTION

Figure 1:
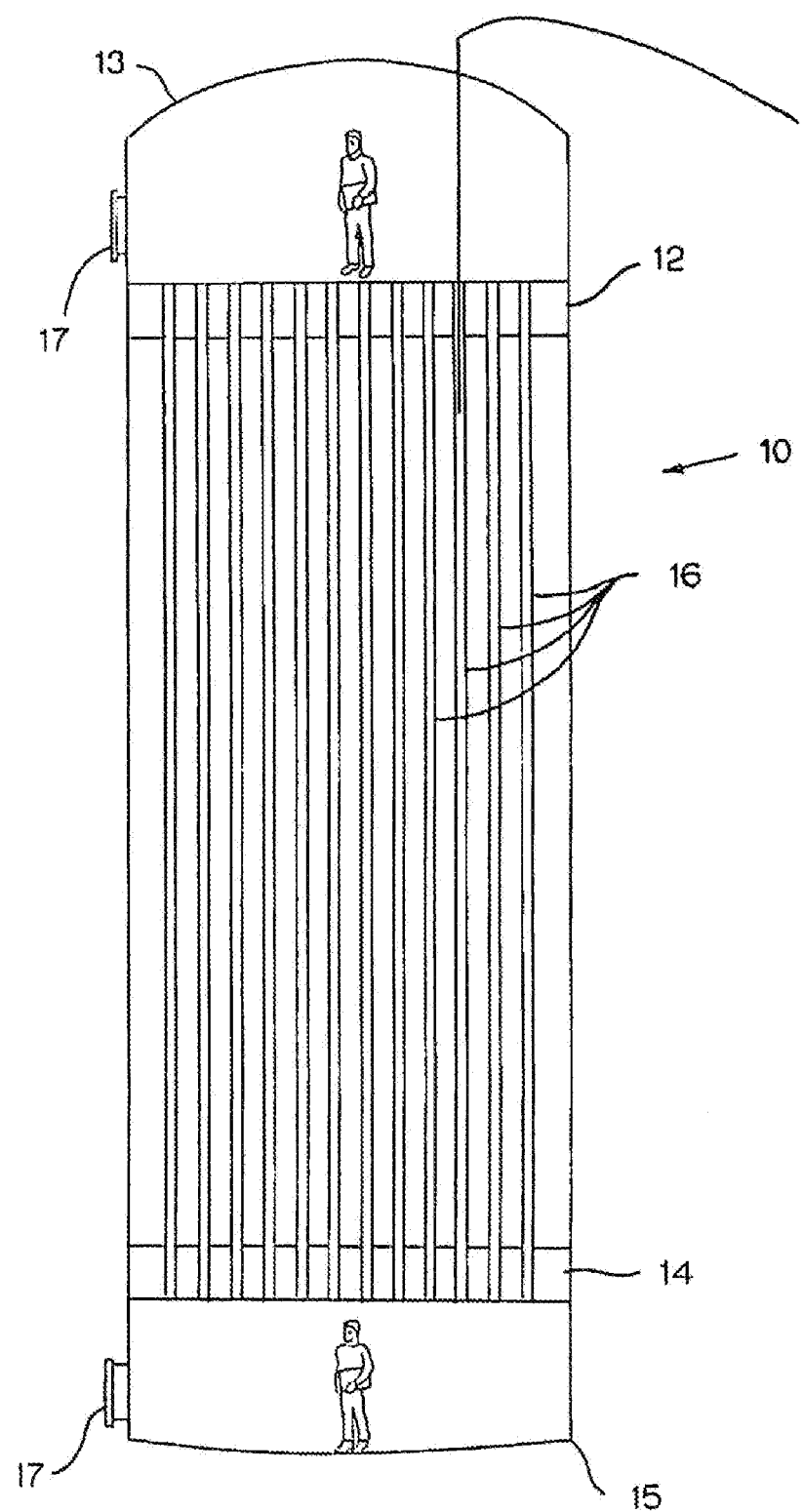
FIG. 1 is a schematic, section view of a shell and tube type of chemical reactor vessel.

FIG. 1 depicts a typical chemical reactor vessel 10, which is a shell and tube heat exchanger, having an upper tubesheet 12 and a lower tubesheet 14 with a plurality of vertical tubes 16 welded or expanded to the tubesheets 12, 14 to form a tightly packed tube bundle. There may be from one to many hundreds or even thousands of cylindrical tubes 16 extending between the tubesheets 12, 14. Each tube 16 has a top end secured to the upper tubesheet 12 and a bottom end secured to the lower tubesheet 14, and the tubes 16 are open at both ends, except that there may be a spring, clip or grid at the bottom end to retain catalyst pellets inside the tube. The upper and lower tubesheets 12, 14 have openings that are the size of the outside diameter of the tubes 16, with each tube 16 being located in respective openings in the upper and lower tubesheets 12, 14.

The vessel 10 includes a top dome (or top head) 13 and a bottom dome (or bottom head) 15, as well as manways 17 for access to the tubesheets 12, 14 inside the vessel 10. The manways 17 are closed during operation of the reactor but are opened for access, such as during catalyst handling. In this instance, the tubes 16 are filled with catalyst particles, which facilitate the chemical reaction. (It may be noted that similarly-shaped shell and tube heat exchangers may be used for other purposes, such as for a boiler or other heat exchanger.)

Reactors have either fixed or removable heads. In this embodiment, the heads are fixed, and they include manways 17 at the top and at the bottom.

This particular reactor vessel 10 is fairly typical. Its tubes can range in length from 5 feet to 65 feet, and it is surrounded by a structural steel skid or framework (not shown), which includes stairways or elevators for access to the tubesheet levels of the reactor vessel 10 as well as access to intermediate levels and to a topmost level which may be located at or near the level of the top opening of the reactor vessel 10. On a regular basis, which can be every 2 to 48 months or longer, as the catalyst becomes less efficient, less productive, or "poisoned", it is changed out, with the old catalyst being removed and a new charge of catalyst being installed in the tubes 16 of the reactor vessel 10. Catalyst handling also may have to be done on an emergency basis, on an unplanned and usually undesirable schedule.

A catalyst change operation involves a complete shutdown of the reactor, which may result in considerable cost due to lost production. It is desirable to minimize the amount of time required for the catalyst change operation in order to minimize the lost production and accompanying cost caused by the reactor shutdown as well as for other reasons.

Figure 2:
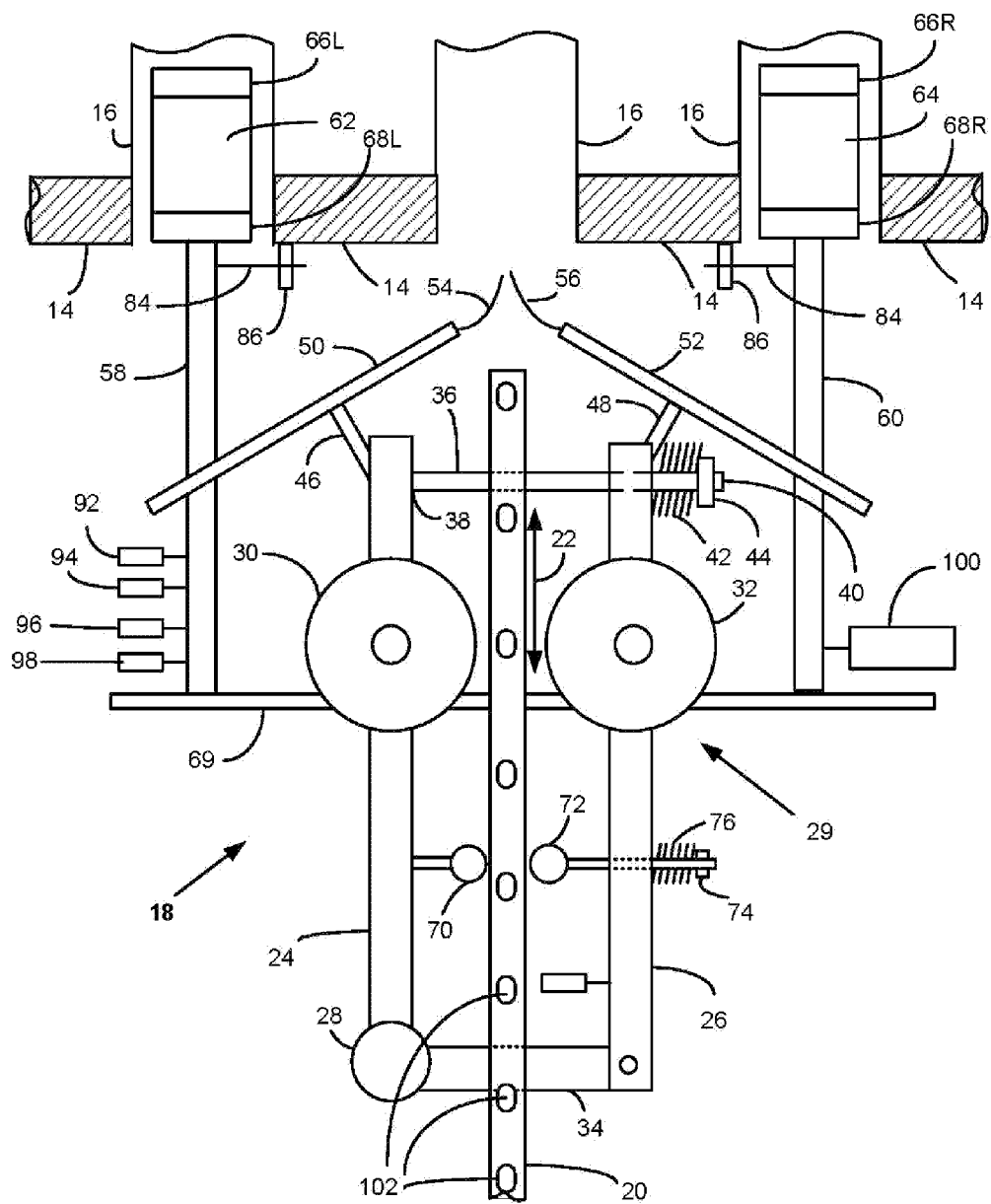
FIG. 2 is a broken away, side view, partially in section, of the lower tubesheet of the reactor of FIG. 1 with an automatic catalyst unloading device and its corresponding mounting mechanism before the device is mounted and in operation.

FIG. 2 shows an automatic catalyst unloading device 18. The catalyst unloading device 18 includes a fish tape 20 (a stiff metal tape or rod) mounted for linear motion in the direction of the arrow 22 relative to the catalyst unloading device 18, driven by a tape drive 29 which includes two rollers 30, 32 as described below.

Two substantially parallel arms 24, 26 are pivotably mounted relative to each other via a pivot joint 28 which allows the two rollers 30, 32, which are mounted to the arms 24, 26 respectively, to come together to squeeze the fish tape 20, as explained in more detail later. The two arms 24, 26 are interconnected at their lower ends by a bar 34 (connected to the pivot joint 28) and at their upper ends by a rod 36. A first end 38 of the rod 36 is attached to the arm 24, and the second end 40 of the rod 36 extends through a hole in the arm 24, then passes through a spring 42, which is held onto the end 40 of the rod 36 by means of a nut 44.

Figure 5:
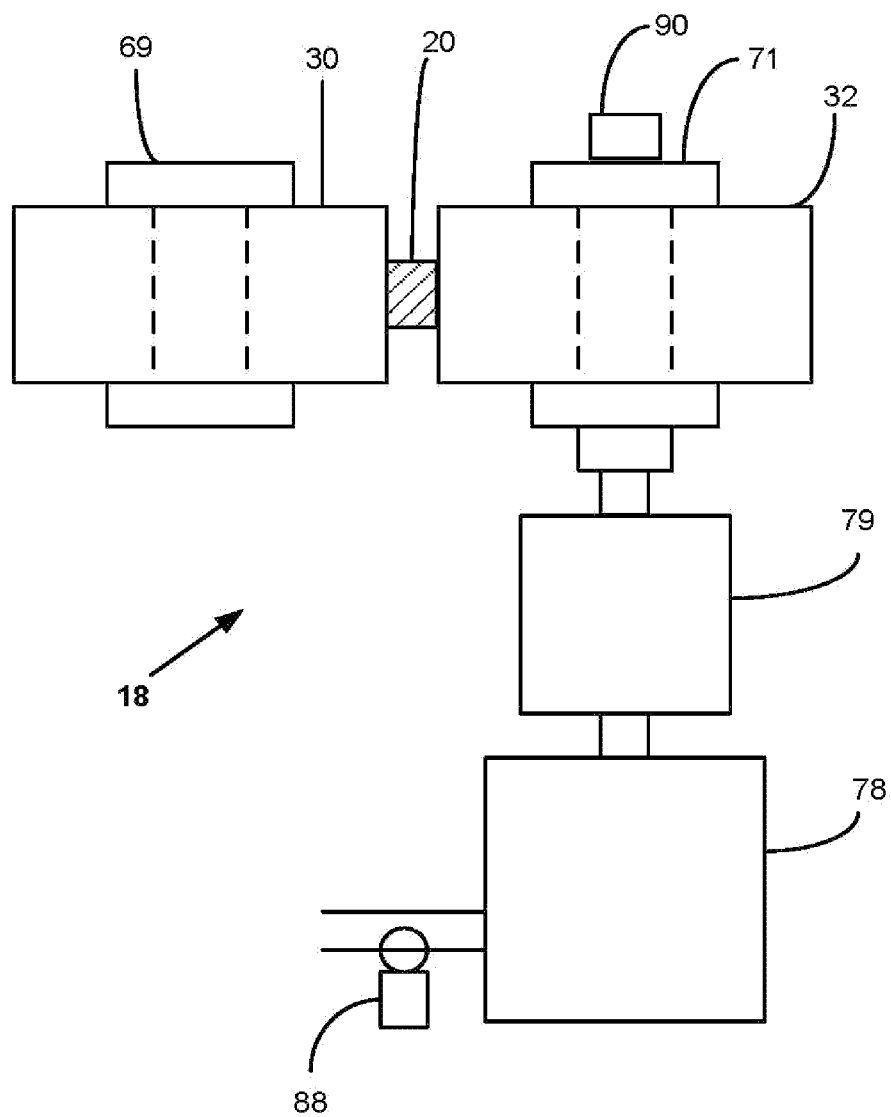
FIG. 5 is a section view along line 4-4 of FIG. 3, but with the driving rollers shown in their engaged positions

By tightening the nut 44 onto the end 40 of the rod 36, the spring 42 is compressed, which moves the arms 24, 26 together and applies a tensioning force to keep these two arms together, squeezing the fish tape 20 in between the rollers 30, 32, as shown in FIG. 5 and as explained in more detail later.

Extending upwardly from the arms 24, 26 are two brackets 46, 48 which support shields 50, 52, respectively. The shields 50, 52 are placed so as to prevent catalyst particles (not shown), which are falling out of the bottom of the tube 16 that is aligned with the fish tape 20, from falling onto the rollers 30, 32 and other mechanisms in the catalyst unloading device 18. Brushes 54, 56 are mounted on the shields 50, 52 and are directed toward each other to further hug the fish tape 20 (as best appreciated in FIG. 3) as it reciprocates into and out of the tube 16. The brushes 54, 56 are flexible members which help clean the fish tape 20 and prevent catalyst particles from falling on the mechanisms in the catalyst unloading device 18. The shields 50, 52 could be a rubber flap with a slit in it for the fish tape 20 to pass through.

FIG. 2 also shows two stanchions 58, 60 which are used to support the catalyst unloading device 18 so that it hangs from the lower tube sheet 14. Each stanchion 58, 60 has an expandable member 62, 64 at its upper end, and each expandable member 62, 64 is sandwiched between two rigid members 66L, 68L and 66R, 68R respectively. As may be appreciated in FIG. 3, the expandable members 62, 64 are expanded to press against the inside surfaces of their respective tubes 16. This provides sufficient frictional force to support the unloading device 18. The stanchions 58, 60 extend downwardly to the support platform 69 which is secured to the arms 24, 26.

Figure 3:
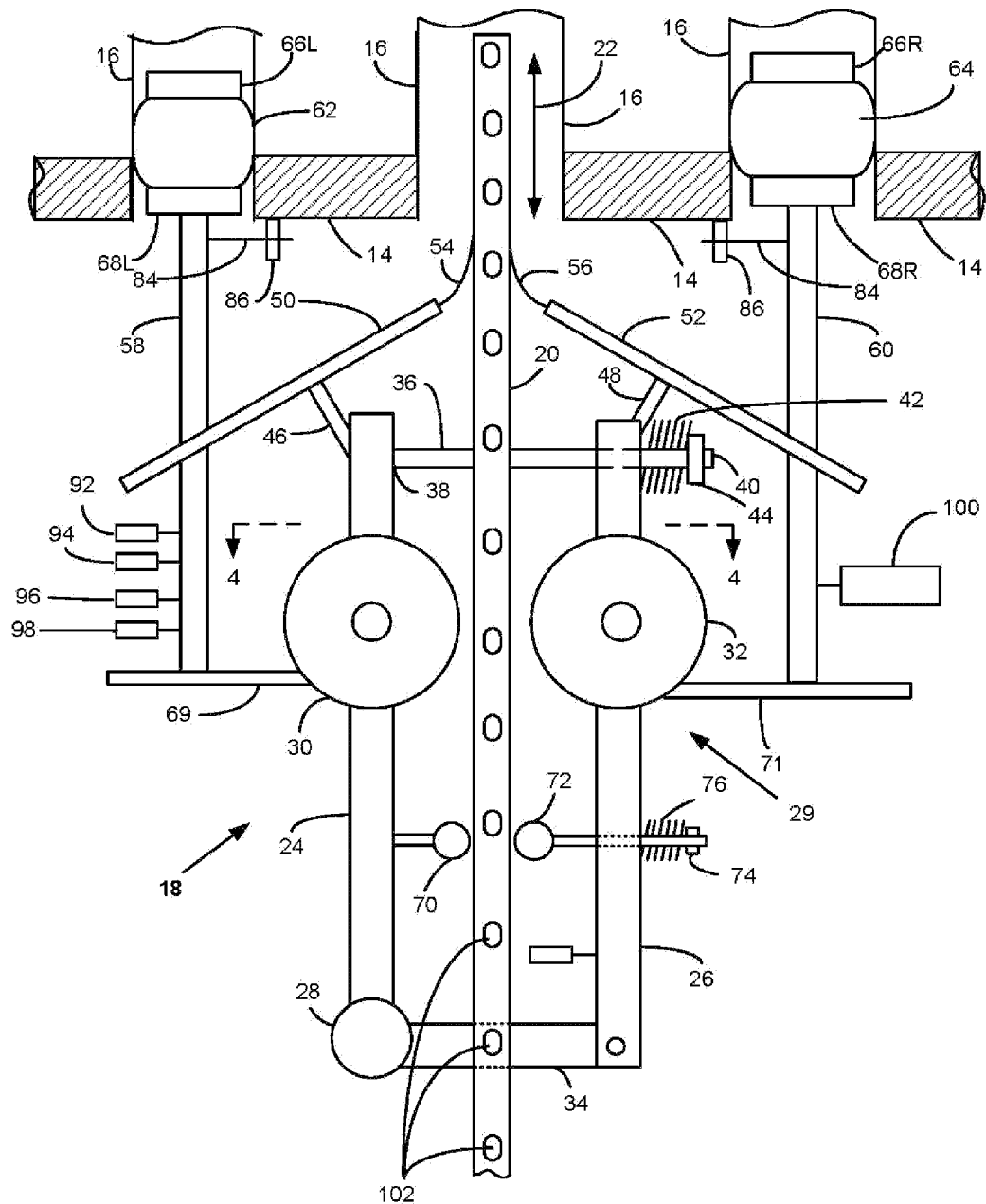
FIG. 3 is the same view as FIG. 2, with the device mounted for operation, but with the driving rollers in their disengaged positions.

The expandable members 62, 64 may be bladders that are expanded by injecting a gas into their interior and inflating them between their respective rigid ferrules 66, 68. Alternatively, the expandable members 62, 64 may be flexible plugs that may be expanded by compressing their respective upper and lower rigid plates 66L, 68L, 66R, 68R toward each other, thus causing the flexible plugs 62, 64 to deform and expand radially outwardly, as shown in FIG. 3.

Referring again to FIG. 3, the catalyst unloading device 18 also includes at least one bracket 84 projecting from the stanchions 58, 60, and an insertion switch 86 secured to its corresponding bracket 84. The switch 86 serves as a type of lockout device, in that it completes a circuit which allows the bladders 62, 64 to be inflated and the reversible drive 29 to be operated only when the switch 86 is pressed far enough up against the bottom tube sheet 14 to indicate that the catalyst unloading device 18 is properly positioned against the bottom tube sheet 14 with the bladders 62 entirely inside their respective reactor tubes 16. This feature prevents the undesirable event of a bladder inflation outside the tube 16, which could damage the bladder 62 and prevents the fish tape 20 from being moved by the tape drive 29 before the fish tape 20 is in the proper position The catalyst unloading device 18 further includes an encoder 70. An idler pulley 72 provides support opposite the encoder, and a nut 74 and spring 76 adjustment mechanism allows for tensioning of the idler pulley 72 against the fish tape 20 on the opposite side of and at the elevation of the encoder 70. The fish tape 20 includes a plurality of evenly spaced apart markers 102. The markers 102 may be just visual markings on the fish tape, or they may be holes in the fish tape or magnets, or any type of indicators that can be detected by the encoder 70 to provide information as to the amount of fish tape that has passed by the encoder 70, which indicates the position of the fish tape within the reactor tube 16 as the fish tape 20 moves up and down within the reactor tube 16. As discussed later, the parameters which can be obtained from readings by the encoder 70 and which may be useful in the automatic operation of the catalyst unloading device 18 include the direction of motion of the fish tape 20, the speed with which the fish tape 20 is moving in that direction, and the net distance traveled by the fish tape 20 in that direction. As discussed in more detail below, the markers 102 may be magnets or optical targets applied to or embedded into the fish tape 20.

FIGS. 19, 20, and 20A show an embodiment of a fish tape 20 with embedded magnets 102 which function as the markers 102 to be detected by the encoder 70. In this embodiment the fish tape 20 is a plastic laminate with a curved cross-sectional profile (See FIG. 20A) which adds stiffness to the fish tape 20 in much the same manner as the tape of a typical wind-up tape measure which has a curved surface for the same reason. Small, powerful, permanent magnets 102 are placed and trapped between two sheets 104, 106 of laminate material, evenly spaced at regular intervals along the length of the fish tape 20. The plastic laminate 104 provides very little sliding resistance against the inside wall of the tube 16 being unloaded of catalyst. The curved profile of the fish tape 20 hugs the wall of the tube 16, which also helps in preventing the fish tape 20 from bending. The magnets 102 not only provide readily readable markers 102 for detection by the encoder 70 or by a magnetic reed switch (also considered to be a type of encoder); they also help keep the fish tape 20 hugging the wall of the tube 16 for added stiffness.

Referring back to FIG. 2, an electronic display panel 100 may be used to display images or text. In one embodiment, the electronic display panel 100 displays the % complete in the unloading process for the current tube 16. The encoder 70 provides the distance information, which is translated by a processor, which knows the length of the reactor tube 16, into % complete (or % of the total length of the tube that has been spanned by the fish tape 20). The information could also be expressed as feet (or meters) of fish tape 20 inside the current tube, or expected time (in seconds or minutes) before completion of the unloading process for the current tube. When the encoder 70 determines that the current tube 16 has been completely unloaded, it reverses the drive 78 (See FIG. 5) to fully retract the fish tape 20 out of the current tube 16 in preparation for unloading the next tube 16, as discussed in more detail below.

Figure 4:
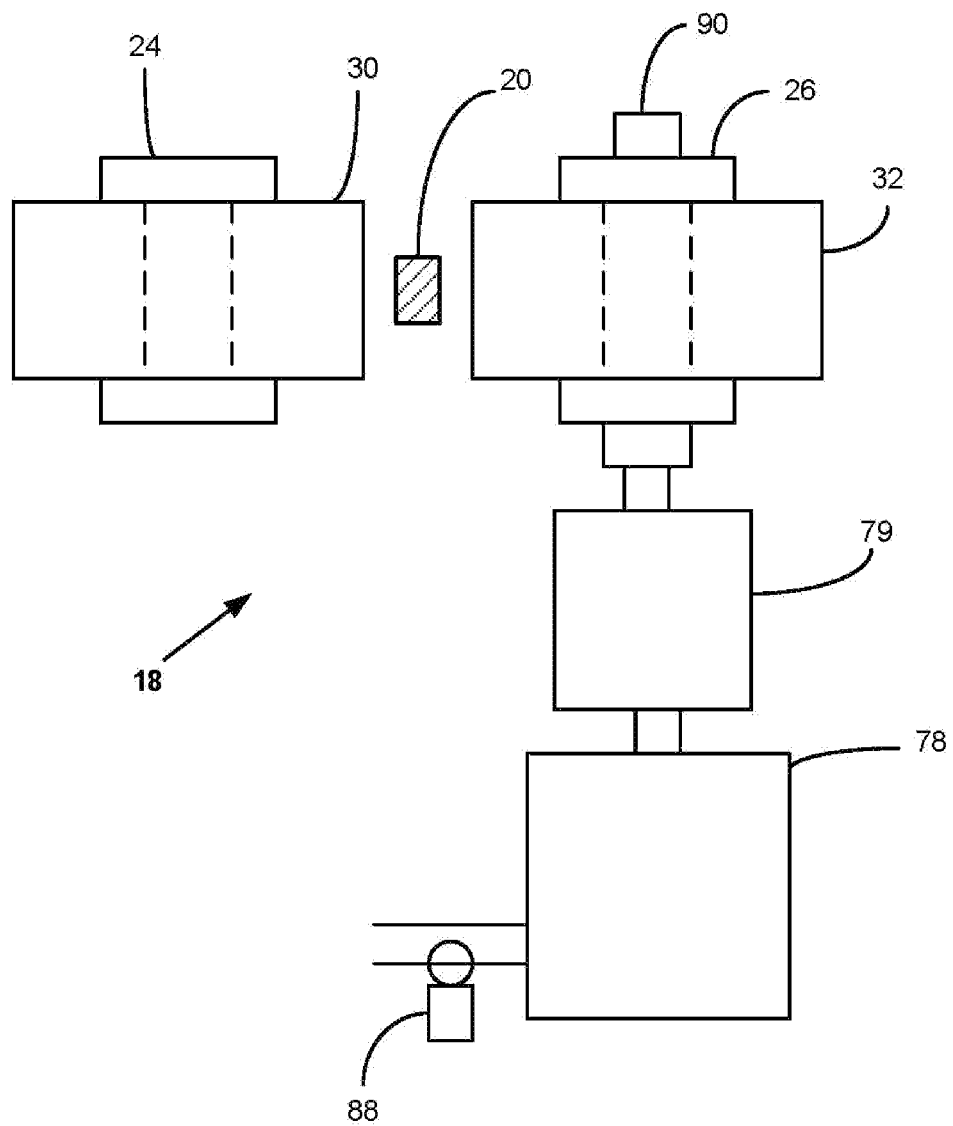
FIG. 4 is a section view along line 4-4 of FIG. 3.

Referring now to FIG. 4, it may be appreciated that the rollers 30, 32 are supported on the arms 24, 26, respectively, which, as indicated earlier, are supported on the platform 69 which in turn is suspended from the bottom tube sheet 14 via the expandable members 62, 64 and the stanchions 58, 60. In a preferred embodiment, one or both of the rollers 30, 32 are adjustably mounted on their respective support arms 24, 26 such that the rollers 30, 32 may be adjusted toward each other to squeeze the fish tape 20 between them, as shown in FIG. 5. At least one of the rollers 32 is driven by a reversible drive 78, such as a reversible electrical motor or a pneumatic motor, while the second roller 30 may be an idler roller or another driven roller.

A portable stand (not shown) could be used to support the device on the ground below one or more reactor tubes instead of or in addition to supporting the device by suspending it from the reactor tubes.

An automated controller (not shown) receives signals from the encoder 70 and from the interlock 86 and controls the reversible drive 78 and the inflation of the bladders 62, 64. The controller can be programmed to control the reversible drive 78 to insert and withdraw the fish tape 20 in a desired pattern. FIGS. 6A through 6F which show how the fish tape 20 is first inserted into a reactor tube 16 to disturb a number of catalyst pellets 80 that have formed a bridge 82 or that are otherwise lodged in the reactor tube 16.

In FIG. 6A, the fish tape 20 is inserted and moved upwardly inside the tube 16 toward a catalyst bridge 82 within the tube 16. When the fish tape 20 impacts against the bridge 82 (See FIG. 6B) the encoder 70 notes that upward progress of the fish tape 20 has stopped. (Or an increase in current to the reversible drive or an accelerometer sensing vibration or a sensor detecting sound or some other type of sensor could be used to sense that the fish tape 20 has contacted the bridged pellets 80 and to send a signal to the central controller indicating that occurrence.) As the fish tape 20 contacts the pellets 80 in the bridge 82, it dislodges some of the catalyst pellets 80, breaking the bridge 82. The controller then signals the reversible drive to reverse the direction of travel of the fish tape 20, quickly withdrawing the fish tape 20 downwardly and then quickly pulsing the fish tape 20 upwardly and downwardly (See FIGS. 6C-6E), in a motion that may be referred to as dithering. The dithering motion could also include rapid, erratic movement, which keeps the fish tape 20 moving to help ensure that any falling catalyst pellets 80 do not have an opportunity to form a bridge around the fish tape 20, which could jam the fish tape 20. Eventually, a new bridge 82 forms (See FIGS. 6D-6F). The controller ends the dithering and then causes the reversible drive to advance the fish tape 20 upwardly toward this new catalyst bridge 82 to start the process anew. Note that the fish tape 20 does not have to be completely withdrawn from the tube 16 during this unloading process. Of course, once the tube 16 has been completely unloaded, the fish tape 20 would be removed and inserted into another tube 16 to be unloaded.

The fish tape 20 is preferably operated in a manner similar to that shown in FIG. 7. This chart shows that the speed of extraction of the fish tape 20 (the downward movement) is at least twice the speed of insertion (the upward movement) or faster than the pellets when first disturbed can fall due to gravity alone. The chart also shows how the amount of insertion and extraction varies as a given tube 16 is unloaded as well as showing the dither motion of the fish tape 20.

Referring again to FIG. 7, as the fish tape 20 is first inserted into the bottom of the tube 16, the insertion time is relatively long (that is, it takes the fish tape 20 a relatively long time to be inserted a relatively short distance when at the bottom of the tube 16). However, once the pellets 80 have been disturbed, the fish tape 20 is retracted relatively quickly, at least twice as fast as the rate at which it went in. In this particular graph, the fish tape 20 is pulled downwardly at a rate that is at least twice the speed at which it had been inserted upwardly. The retraction of the fish tape 20 is followed by a dithering motion where the fish tape 20 is pulsed upwardly and downwardly quickly for short distances.

The second part of the graph shows that, as the fish tape 20 is inserted to a higher elevation within the tube 16, the speed of upward travel is increased from the speed of upward travel that was used at a lower elevation, and the speed of retraction at the higher elevation is also increased from the speed of retraction at the lower elevation. Finally, the dithering motion is more pronounced, with the amplitude of the motion (upward travel distance and downward travel distance) being larger and at a higher frequency than at the lower elevation.

The fish tape 20 insertion and extraction including dither functions are controlled by the micro controller (not shown)

and other electronic circuits along with powerful motors 78 and gearboxes 79 (See FIGS. 4 and 5) as well as linear actuators and air cylinders to drive the various rollers, conduits and fish tapes, as discussed later. It should be obvious to those skilled in the art that changes can be made to the software in the controller to control the rate and direction of motion of the fish tape 20 as desired to achieve the best results.

As shown in FIG. 3, to unload catalyst from the reactor tubes 16, the catalyst unloading device 18 is installed under the lower tube sheet 14, suspended below the lower tube sheet 14 by the stanchions 58, 60 which are secured in the tubes 16 via the expanded flexible members or bladders 62, 64, such that one end of the fish tape 20 is directly underneath the tube 16 to be unloaded. The rollers 30, 32 are adjusted by threading in the nut 44 on the rod 36 so that the rollers 30, 32 are squeezing against the fish tape 20, as shown in FIG. 5. The encoder 70 is also adjusted such that both the encoder pulley 70 and the idler pulley 72 are pressing against the fish tape 20. Finally, once the spring (not shown) in the bottom of the tube 16 to be unloaded is removed, the controller and the drive 78 on the roller 32 are powered on. The controller causes the roller 32 to rotate clockwise from the point of view of FIG. 3 to feed the fish tape 20 automatically into the tube 16, as shown in FIG. 3, until the controller recognizes, based on signals received from the encoder 70, that the fish tape 20 is advancing at less than the programmed rate. This indicates that the fish tape 20 has hit an obstacle, such as the bridge 82 of FIG. 6A, so the controller reverses the drive motor 78 so as to retract the fish tape 20 within the tube 16. The action taken upon encountering an obstacle may be programmed into the automated controller depending on a desired algorithm. For example, the controller may be programmed to reverse the drive motor 78 in order to retract the fish tape 20 only a short distance the first three times the fish tape 20 hits an obstacle without substantial upward progress between each forward motion of the fish tape 20. After these first three attempts, the controller may be programmed to completely retract the fish tape 20 from the tube 16 before attempting a fresh start at unloading the tube 16. The controller may be programmed so that, as long as the encoder 70 senses sufficient upward progress, it continues to cause the drive motor 78 to drive the fish tape 20 upwardly, or it may be programmed to cause the drive motor 78 to stop and reverse slightly after every 5 feet (or other desired distance) of upward progress even if no obstruction is encountered. As discussed earlier, in a preferred embodiment, the controller causes the fish tape 20 to follow a path dictated by an algorithm which first drives the fish tape 20 upwardly until a bridge 82 is contacted (as explained in more detail below), the fish tape 20 disrupts the bridge 82 and is then quickly retracted, at least partially, and then pulsed up and down to allow catalyst particles 80 to fall out of the tube 16 before the fish tape 20 is once again moved upwardly until it contacts the next bridge 82. The process is repeated until the tube 16 has been fully emptied of catalyst particles 80.

The controller may recognize that the tube 16 has been fully emptied of particles 80 when the fish tape 20 has played out an upward distance that represents the full length of the reactor tube 16.

In addition to keeping track of the rate of travel of the fish tape 20, the controller keeps track of the net length of fish tape 20 that has travelled upwardly above the encoder 70. Once the controller determines that enough fish tape 20 has been fed into the tube 16 to ensure that all the catalyst in the tube 16 has been removed, the controller causes the drive motor 78 to be reversed so that the fish tape 20 is fully retracted. At that point, the expandable members 62, 64 may be retracted, and the catalyst unloading device 18 may be moved to a new location to unload another tube 16.

The controller monitors certain operating parameters on the fish tape drive (which includes the drive motor 78, the gearbox 79, and the drive roller 32) to ascertain the status of fish tape 20 relative to the catalyst pellets 80 in the tube 16 being unloaded, and the controller can use this information to determine a course of action based on its pre-programmed algorithm. For example, the controller monitors the output (amperage draw) of a current transformer 88 on the drive motor 78 (See FIG. 5). The current input demand by the drive motor 78 spikes (surges) when the fish tape 20 contacts a bridge 82 of catalyst pellets. The controller can also monitor the output of an accelerometer 90 to detect when the fish tape 20 has struck a bridge 82 of catalyst pellets 80. Both the current transformer 88 and the accelerometer 90 can be used together to confirm when the fish tape 20 contacts a bridge 82 of catalyst pellets 80 in the tube 16 being unloaded. In such a case, the controller can direct the fish tape 20 to move as desired to most effectively remove the catalyst pellets 80. The device also may use a sensor such as a photo cell (not shown) to sense whether pellets 80 are falling downwardly through the tube 16 and to communicate that information to the central controller. The device may use one or more indicator lights to communicate with the operator, as discussed below.

Referring back to FIG. 2, the catalyst unloading device 18 includes four indicator lights 92, 94, 96, 98 and an electronic display panel 100. The indicator lights may be used to indicate the operating status of the catalyst unloading device 18. For instance a yellow light 92 for "ready", a green light 94 for "in use", a red light 96 for "error", and a blue light 98 for any "other" status indication that may be desired (such as test mode, or transitioning to the next tube, or "high amperage" indicating a potential jam of the fish tape, or special condition such as idle too long). In addition, one or more indicator lights may indicate the direction of travel of the fish tape 20 and the rate of speed of the fish tape 20.

FIGS. 8-14 show another embodiment of a fish tape 20* which may be used in the catalyst unloading device 18 of FIG. 2. As may be appreciated from FIG. 9, the fish tape 20 includes a circular cross-section conduit 108 which houses and slidably supports a square cross-section rod 110 for axial motion of the rod 110 relative to the conduit 108 in the direction of the arrow 146 (See FIG. 11). As discussed below, the rod 110 not only moves axially along the length of the conduit 108, it also rotates about its own longitudinal axis in the direction of the arrow 148 (See FIGS. 11 and 12), resulting in a "corkscrew"-type of motion of the rod 110 relative to the conduit 108.

Referring to FIG. 8, only the fish tape 20* and the rollers 30, 32 of the catalyst unloading device 18 are shown, with other items removed for clarity. It is understood that the rest of the catalyst unloading device 18 shown in FIG. 2, as well as other components described above with respect to this embodiment of the catalyst unloading device 18 are present (or can be present) to render the device 18 operational.

The proximal end 112 (See FIG. 10) of the fish tape 20* is secured to the "corkscrew" drive 114 (See FIGS. 8 and 13). Referring to FIG. 8, the entire fish tape 20* assembly, including the "corkscrew" drive 114, is advanced and retracted, in the direction of the arrow 142, by the catalyst unloading device 18 via the rollers 30, 32.

The "corkscrew" drive 114 (See FIG. 13) includes an air cylinder 116 and a guide cylinder 118 mounted on a common base 120. The proximal end 112 of the conduit 108 is attached to the guide cylinder 118 such that there is no relative motion between these two parts 108, 116. A rod 122 connects the air cylinder 116 to a follower plug 124 which rides inside the bore 126 of the guide cylinder 116. The follower plug 124 is mounted for rotation about its own longitudinal axis, in the direction of the arrow 132 of FIG. 15A, independently of the rod 122, actuated by the air cylinder 116, which pushes and pulls on the follower plug 124.

Referring to FIG. 14, the guide cylinder 116 defines a very short and deep internal helical groove 128. The follower plug 124, as shown in FIGS. 15 and 15A, is a cylindrical plug with a follower pin 130. This follower pin 130 rides in the groove 128 in the bore 126 of the guide cylinder 118. When the air cylinder 116 pushes or pulls on the follower plug 124 to move the follower plug 124 longitudinally along the length of the guide cylinder 118, the follower pin 130, riding in the groove 128, forces the follower plug 124 to rotate about its own longitudinal axis. The resulting motion is a corkscrew-type motion which combines longitudinal motion and rotation. This corkscrew-type motion also is imparted to the rod 110 which is connected to the follower plug 124, as shown in FIG. 13. Since the conduit 108 is secured to the guide cylinder 118 and the rod 110 is secured to the follower plug 124 which moves in a corkscrew-type motion relative to the guide cylinder 118, the rod 108 also moves with a corkscrew-type motion relative to the conduit 108.

FIGS. 8, 11, and 12 show the distal end 134 of the fish tape 20*. The conduit 108 terminates in a crescent-shaped plate 136 (See FIG. 12) which is secured to and moves with the conduit 108. The crescent-shaped plate 136 includes a set of magnets 138 which act to bias the plate 136 against the wall of the tube 16 (which is made from a ferro-magnetic metal alloy). The plate 136 also includes a set of nubs 140 to space the plate 136 away from the wall of the tube 16. The nubs 140 are preferably made using a very hard and wear resistant material and serve to reduce the contact surface area of the plate 136 against the wall of the tube 16 to minimize the friction resistance between the plate 136 and the wall of the tube 16. The conduit 108 and the plate 136 move upwardly and downwardly within the tube 16, in the direction of the arrow 142 (See FIGS. 8 and 11), driven by the rollers 30, 32 (See FIG. 8) of the catalyst unloading device 18.

The rod 110 terminates in an arm 144 which is securely attached to the rod 110. The arm 144 moves in the corkscrew motion along with the rod 110 to which it is attached.

The purpose of the plate 136, besides supporting the end of the fish tape 20*, is to reduce the cross-sectional area of the tube 16, which reduces the flow rate of falling particles 80 flowing through the tube and thereby reduces the opportunity for bridging of particles 80 below the plate 136.

FIG. 16 shows the distal end of the rod 110 of the fish tape 20* of FIG. 11. It may be appreciated that the arm 144 projects at substantially a 90 degree angle to the longitudinal axis of the rod 110. FIG. 17 shows another embodiment of the distal end of the rod 110*, wherein the arm 144* projects at substantially a 45 degree angle to the longitudinal axis of the rod 110*.

FIGS. 18A through 18D are plan views of the distal end of various embodiments of the fish tape, similar to the view of FIG. 12, but with the tube omitted for clarity. FIG. 18A is in fact the same view as FIG. 12, showing the plate 136, the arm 144, the rod 110, and the nubs 140. In FIG. 18B the nubs 140 have been eliminated. In FIG. 18C the plate 136C is asymmetrical and the rod 110C is located on the larger end of the plate 136C. In FIG. 18D the plate 136D is symmetrical but with larger areas at both ends and with the rod 110D located on one of these larger areas of the plate 136D. In FIGS. 18E through 18N only the respective plates 136E through 136N are shown (their respective rods and arms are omitted for clarity). It may be appreciated that the plate 136 may have any of a large number of profiles as long as it serves its purpose of reducing the cross-sectional area of the tube 16.

Figure 21:
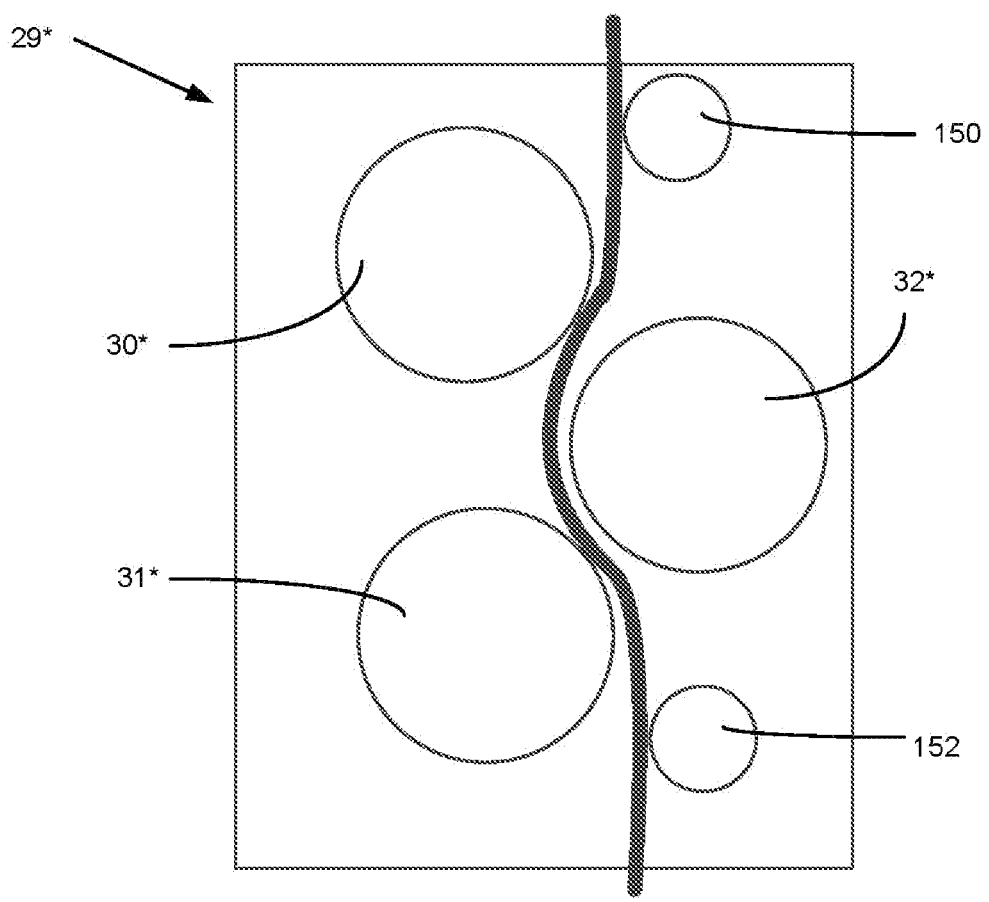
FIG. 21 is a schematic view of an alternate embodiment of a feed drive for the fish tape of FIG. 2.

FIG. 21 is a schematic view of an alternate embodiment of a tape feed drive 29* which may be used instead of the tape feed drive 29 of FIG. 2. As may be appreciated, instead of having just two rollers 30, 32 (See FIG. 2), this tape feed drive 29* has three rollers 30*, 31*, 32* and two guide rollers 150, 152. By partially wrapping the fish tape around the roller 32*, and causing the fish tape to curve rather than to run only in a straight line, this arrangement provides a more positive grip on the fish tape 20. The idler rollers 30*, 31* are adjustably mounted on the arm 24 (See FIG. 2), and the guide rollers 150, 152 are adjustably mounted on the arm 26 to ensure a smooth and positive feed of the fish tape 20. This tape feed drive 29* operates in substantially the same manner as the tape feed drive 29 of FIGS. 2 and 3.

FIGS. 22 and 23 are schematic views of another embodiment of a catalyst unloading device 18*. The mechanics of the catalyst unloading device 18* are similar to that of the catalyst unloading device 18 of FIGS. 2 and 3, except that this device 18* utilizes an already-unloaded tube as a housing in which to store the unused portion of the fish tape 20 so it is out of the way while an adjacent tube is being unloaded, as described in more detail below.

It may be appreciated that this catalyst unloading device 18* includes expandable members 62*, 64* to suspend the device 18* from the tubes 16 via stanchions 58*, 60*. The support platform 69* of this unloading device is longer than the platform 69 of the previous device 18 such that this device 18* may span a larger number of tubes 16. In the embodiment shown in FIG. 22, the device 18* spans a total of 8 tubes 16 (including the tubes 16 accommodating the expandable members 62*, 64*), however the device 18* could span more or fewer tubes 16, as desired.

A carriage 154* rides along the platform (or track) 69*, and this carriage 154* contains all the operational elements found in the device 18 of FIG. 2 (including the feed rollers 30, 32, and the encoder 70) but which are omitted from FIGS. 22-23 for clarity. The carriage 154* also includes a direction-reversal roller 156* and idler rollers 158*, the purpose of which is described below. The carriage 154* may be moved manually along the length of the platform 69* or it may be programmed to automatically index from one tube 16 to the next tube 16 until all the tubes 16 between the expandable members 62*, 64* have been unloaded of catalyst.

Referring to FIG. 22, to operate this catalyst unloading device 18*, a first tube 16a is unloaded by pushing one end 164 of the fish tape 20 upwardly and downwardly in the tube 16a as described earlier. When the first tube 16a is being unloaded, the unused portion and second end 162 of the fish tape 20 lies outside of any tube, such as on the floor of the reactor vessel or extending out a manway. Once the first tube 16a has been fully unloaded, the one end 164 of the fish tape 20 is near the top of the tube 16a, and the majority of the fish tape 20 is lying inside that empty first tube 16, allowing the first tube 16a to serve as a storage vessel for that part of the fish tape 20. At this point, as shown in FIG. 22, the other end 162 of the fish tape 20 remains on the carriage 154*.

As shown in FIG. 23, the other end 162 of the fish tape 20 is then aligned with and inserted into the tube 16c following the up-and-down and dithering patterns described earlier in order to unload the tube 16c. Once the tube 16c has been unloaded, the carriage 154* can then be moved as needed to align the one end 164 of the fish tape 20 with the bottom opening of another tube 16b, and the process is repeated, with the most recently unloaded tube serving as a storage area for the fish tape 20 for the next unloading process, and with the ends 162, 164 alternating in entering the next tube 16 to be unloaded. What is shown here is the carriage moving along a single row of tubes. Alternatively, it may be desirable for the drive rollers to be oriented so that the one end 164 of the fish tape is aligned with and enters into a tube on one row, and the other end 162 of the fish tape is aligned with and enters into a tube on the next adjacent row, so that, as the carriage 154* moves along the platform or track 69*, the device cleans out two adjacent rows of tubes.

Once the tubes between the expandable members 62*, 64* have been unloaded, the catalyst unloading device 18* is then moved to a new position, in which the carriage 154* can align the fish tape 20 with a new set of tubes 16 to be unloaded. The majority of the fish tape 20 may remain inside any of the already emptied tubes as the device 18* is relocated. The device 18* can also be configured to operate automatically or by remote control.

It will be obvious to those skilled in the art that modifications may be made to the embodiments described above without departing from the scope of the invention as claimed.

What is claimed is:

1. A method for unloading particles from a plurality of vertical chemical reactor tubes, comprising the steps of:
   releasably fixing a frame adjacent to the bottom of a first vertical reactor tube;
   providing a fish tape mounted on said frame for substantially linear, upward and downward motion relative to said frame, said fish tape having first and second ends;
   aligning the first end of the fish tape with the bottom of the first vertical reactor tube;
   using an automated controller to control a reversible drive repeatedly to advance the fish tape upwardly into the first vertical reactor tube until sensing when a first end of the fish tape has contacted the particles and to retract the fish tape downwardly in response to sensing when the fish tape has contacted the particles to allow the particles to fall out of the bottom of the first vertical reactor tube.

2. A method for unloading particles from a plurality of vertical chemical reactor tubes as recited in claim 1, and further comprising the steps of sensing the motion of said fish tape and transmitting the sensed information to the art automated controller; and
   using the automated controller to control the reversible drive in accordance with a pre-programmed algorithm which takes account of the sensed information.

3. A method for unloading particles from a plurality of vertical chemical reactor tubes as recited in claim 1, and further comprising the step of using the reversible drive to retract the fish tape at a speed that is at least twice the speed at which the fish tape was inserted for any given elevation within the reactor tube.

4. A method for unloading particles from a plurality of vertical chemical reactor tubes as recited in claim 1, and further comprising the step of using the reversible drive to retract the fish tape at a speed that is greater than the speed at which the particles fall by gravity.

5. A method for unloading particles from a plurality of vertical chemical reactor tubes, comprising the steps of:
   releasably fixing a frame adjacent to the bottom of a first vertical reactor tube;
   providing a fish tape mounted on said frame for substantially linear, upward and downward motion relative to said frame, said fish tape having first and second ends;
   aligning the first end of the fish tape with the bottom of the first vertical reactor tube;
   using a reversible drive repeatedly to advance the fish tape upwardly into the first vertical reactor tube until sensing when a first end of the fish tape has contacted the particles and to retract the fish tape downwardly in response to sensing when the fish tape has contacted the particles to allow the particles to fall out of the bottom of the first vertical reactor tube; and
   inserting a second end of said fish tape into a second vertical reactor tube while leaving the first end of the fish tape in the first vertical reactor tube, and then using the reversible drive to drive the second end of the fish tape upwardly into the second vertical tube to contact and dislodge particles from the second vertical tube.

6. A method for unloading particles from a plurality of vertical tubes of a chemical reactor, comprising the steps of:
   inserting a first end of a fish tape having a first end and a second end into a first vertical tube; then
   moving the first end of the fish tape up and down within the first vertical tube to contact and dislodge particles inside the first vertical tube and to allow the particles to fall out of the first vertical tube; then
   while the first end of the fish tape is inside the first vertical tube, inserting the second end of the fish tape into a second vertical tube and moving the second end of the fish tape up and down inside the second vertical tube to dislodge the particles and allow the particles to fall out of the second vertical tube.

* * * * *

UNITED STATES PATENT AND TRADEMARK OFFICE
CERTIFICATE OF CORRECTION

| | | |
|---|---|---|
| PATENT NO. | : 9,138,710 B2 | Page 1 of 1 |
| APPLICATION NO. | : 13/411753 | |
| DATED | : September 22, 2015 | |
| INVENTOR(S) | : Clifford L. Johns et al. | |

It is certified that error appears in the above-identified patent and that said Letters Patent is hereby corrected as shown below:

In The Claims
Column 11, line 44, delete "art"

Signed and Sealed this
First Day of March, 2016

Michelle K. Lee
*Director of the United States Patent and Trademark Office*